United States Patent [19]
Romeu

[11] 3,998,127
[45] Dec. 21, 1976

[54] UNIVERSAL MILLING MACHINE

[76] Inventor: Ramon Romeu, La Rigoulde, Saint-Cere, Lot, France

[22] Filed: June 30, 1975

[21] Appl. No.: 592,003

[30] Foreign Application Priority Data

July 1, 1974 France .............................. 74.22834

[52] U.S. Cl. .................................. 90/14; 90/15 R; 90/20; 90/58 C; 408/234
[51] Int. Cl.² ...................... B23C 1/027; B23C 1/14
[58] Field of Search ............ 90/14, 15 R, 20, 58 R, 90/58 C, 35; 408/69, 71, 234–237

[56] References Cited
UNITED STATES PATENTS

| | | | |
|---|---|---|---|
| 807,634 | 12/1905 | McMillen | 90/35 |
| 2,042,720 | 6/1936 | Lindner | 408/236 X |
| 2,116,122 | 5/1938 | Ocenasek | 90/14 |
| 3,203,314 | 8/1965 | Ried | 90/58 C |
| 3,587,390 | 6/1971 | Lobneis et al. | 90/58 R |
| 3,757,638 | 9/1973 | Martin | 408/235 X |

*Primary Examiner*—Robert Louis Spruill
*Assistant Examiner*—Fred A. Silverberg
*Attorney, Agent, or Firm*—Pollock, Vande Sande & Priddy

[57] ABSTRACT

In a universal milling machine, the workpiece holder table is pivotable about an axis lying above the working surface of the table and in the longitudinal plane of symmetry of the table and is movable longitudinally in a direction parallel to its pivot axis.

13 Claims, 4 Drawing Figures

UNIVERSAL MILLING MACHINE

The present invention concerns milling machines and particularly milling machine capable of machining a work piece over all its faces other than that applied to the table of the milling machine and along planes inclined with respect to the plane of the table.

In order to carry out machining of this kind, milling machines have been conceived in which, besides the basic movements of translation, the tool-holder casing or the workpiece holder table is capable of being moved in rotation. In certain milling machines known as universal milling machines the tool-holder casing, which is movable about two axes of rotation, is orientatable into any direction whatever in space, the table generally extending in a horizontal fixed plane. In other milling machines, in which the tool-holder casing is maintained in general fixed with a vertical axis, the table is orientatable in at least two of the three directions of pivoting about itself and of tilting about two axes at right angles and parallel with the table.

The most highly sophisticated milling machines, however, have disadvantages. In particular, definition of the surface to be machined, which is always tricky, often needs fussy calculations by the operator or the manufacturer. In this connection it must be remembered that for any milling operation the dimensions of the surface to be machined are measured from a reference point on the workpiece which point is taken as the origin for distances, relative positioning of the work piece and the milling tool with respect to one another being affected by means of verniers capable of checking each of the displacement, in translation or rotation, of the table and the tool-holder casing.

In universal milling machine, the machining of a plane inclined with respect to the table, by direct attachment of the workpiece to the table, is in practice possible only in a few simple cases in which the surface to be machined has a width less than the diameter (or the height) of the milling tool employed. That is, when this width is greater, the displacement of the table, which is necessary for bringing another portion of the workpiece opposite the milling tool, necessitates a combination of two motions of translation and hence calculation of two quantities connected with the angle of inclination of the surface to be machined, with respect to the table. In order to alleviate this disadvantage, recourse is had to an auxiliary plate, known as a "single plate", which is interposed between the table and the workpiece so as to bring the surface to be machined back into the horizontal position. The bulk of the single plate reduces the capacity of the machine, and its assembly with the table is a source of vibration.

Vibrations appear when the tool-holder casing is mounted on a beam, overhung with respect to the frame of the milling machine, particularly when the casing is in its extreme position on the beam for machining the plane furthest from the frame.

Another disadvantage of universal milling machine is that the operator must be skilled in controlling machining along a direction inclined with respect to the horizontal, when that is possible. It will be appreciated that the axes of the milling tools are preferably vertical and horizontal and it is unusual for the operator to machine a workpiece along a plane inclined with respect to the horizontal or the vertical. Additionally, milling machines of the kind having the tool-holder casing orientatable with respect to the table, are often very bulky. This is particularly so when the frame is designed so as to enable the casing to pivot through 180°, between −90° and +90°, with respect to the vertical axis. These milling machines are all the more massive and bulky as the frame must be sufficiently rigid to avoid the appearance of vibrations.

In tilting-table milling machines, the axis of tilt being always located more or less underneath the table, any inclination of the table tends to remove the workpiece to be machined from the central position that it was occupying on the milling machine (the further, the greater the inclination), which means that machining operations are carried out in extreme positions of the table and the casing, which are generative of vibrations, and the reference point is displaced so that the calculations for definition of the machining dimensions have to be remade.

Again, the distance of the center of gravity of the table which respect to the axis of tilt is increased when a workpiece is attached to it. The equilibrium of the assembly of the table and workpiece is therefore the more unstable the heavier the workpiece and the greater the inclination.

As in universal milling machines, it is consequently necessary to dimension the frame, the table-supporting elements and the table itself in order to avoid the appearance of vibrations, and to dimension the motors and mechanical systems providing orientation of the table in order to overcome the effect of the weight, which leads to heavy and bulky machines.

The mass and the bulk of the whole of these milling machines are connected in addition with the arrangement of the casing and the table. That is, being both located on one and the same side of the frame, the axis of longitudinal translation of the table is necessarily parallel with this side of the frame and in order to machine long workpieces the table must perform evolutions on its support as far as extreme positions in which the overhang is very great.

Finally it is known that the drives to the head and the table always include a device for taking up clearances. It is clear that this device will be the more stressed the heavier the masses to be displaced and the greater the effect of the weight, and that, while unavoidable clearance will be effectively compensated when the casing or the table is tilted in the direction for which the device is designed, the device will be ineffective when the casing or table is tilted in the opposite direction.

It is an object of the present invention to correct these disadvantages and to enable a milling machine to be produced which, for equal capacity, is more compact and lighter and hence less expensive than the above described machines.

In accordance with the invention there is provided a universal milling machine comprising a fixed frame, a supporting bracket, means mounting said supporting bracket in a central portion of said frame for pivotal movement about an axis fixed with respect to said frame; a workpiece-holder table, means mounting said workpiece-holder table on said bracket for longitudinal translation in a direction fixed with respect to said bracket and parallel to said axis a tool-holder casing; and means mounting said tool-holder casing in an upper portion of said frame; wherein said axis of pivotal movement of said bracket is above said table.

The pivot axis is preferably located in the longitudinal plane of symmetry of the table and the table is advantageously capable of tilting pivoting through 180° between two extreme vertical positions.

Preferably the table includes a plate which is pivotable about an axis fixed with respect to the table, and perpendicular to and intersecting the pivot axis of the bracket.

The tool-holder casing may have a fixed vertical axis and be movable in a plane perpendicular to the pivot axis of the bracket. With the above described machine any workpiece attached to the table will be located in the vicinity of the pivot axis of the bracket. Thus the center of gravity of the assembly of table and workpiece is moved closer to the pivot axis of the bracket. The balance of the assembly is therefore improved and the effect of the weight minimized.

Whatever the inclination of the table, the workpiece remains centered in the milling machine and the casing, being little removed from its central position, can operate under the best conditions.

Finally it is possible to make the reference point which is the origin for the distances coincide with the pivot axis of the bracket. The reference point will thus occupy a fixed position and, whatever the inclination of the table, the calculations of dimensions of the surfaces to be machined can be done very rapidly and directly from verniers.

Further the ability of the table to pivot through 180° enables the surface of the workpiece to be machined to be oriented in a horizontal position no matter what the surface and the tool-holder casing can be maintained with a fixed vertical axis. Thus the operator will always see the milling tool working in the same way. Preferably the casing is capable of being displaced vertically on a carriage which in turn is movable horizontally on the frame of the milling machine. Thus the work to be performed against the weight of the milling tool for displacing the head of the milling machine is limited to that necessary for the vertical displacement of the casing.

In a preferred embodiment the axis of pivot of the bracket is that of a circular window defined in the frame, inside which is seated a hollow cylinder to which the bracket is fixed and which is rotatable about the said axis.

Thus the table can perform evolutions in the hollow cylinder inside the frame and always in the vicinity of the central plane of the frame. No portion of the milling machine need be in overhang. The result is that the workpiece can be machined at any angle with respect to the table and over a great length without risk of undesired vibrations. This arrangement of the table with respect to the frame permits the milling machine to have a smaller bulk which does not exceed that of the frame, in contrast to conventional orientatable milling machines in which it is necessary to leave on opposite sides of the frame sufficient room for receiving the table in its longitudinal displacement of translation and in certain machines the head when this is tilted to one side or the other. The arrangement also permits better balance of the masses which enables them to be reduced and the motors and mechanical systems connected with the displacement of the table and the head to be reduced as well as the devices for taking up clearance, which are much less heavily stressed than in conventional milling machines.

The table and the plate may be moved by a motor fixed in the frame, by way of a toothed crown freely mounted on the hollow cylinder. Means are provided for transforming the motion of rotation of the toothed crown into that of translation and pivotting of the table.

When the casing is mounted on a carriage which is connected to the frame, the displacement of the casing on the carriage and of the carriage on the frame are provided by a motor fixed in the frame (preferably by the same motor as that which drives the table), via a toothed crown freely mounted on the hollow cylinder, and means for transforming the motion of rotation of the toothed crown into that of translation of the casing and the carriage.

The invention will be more fully understood from the following description of an embodiment thereof, given by way of example only, with reference to the accompanying drawings.

Figure 1:
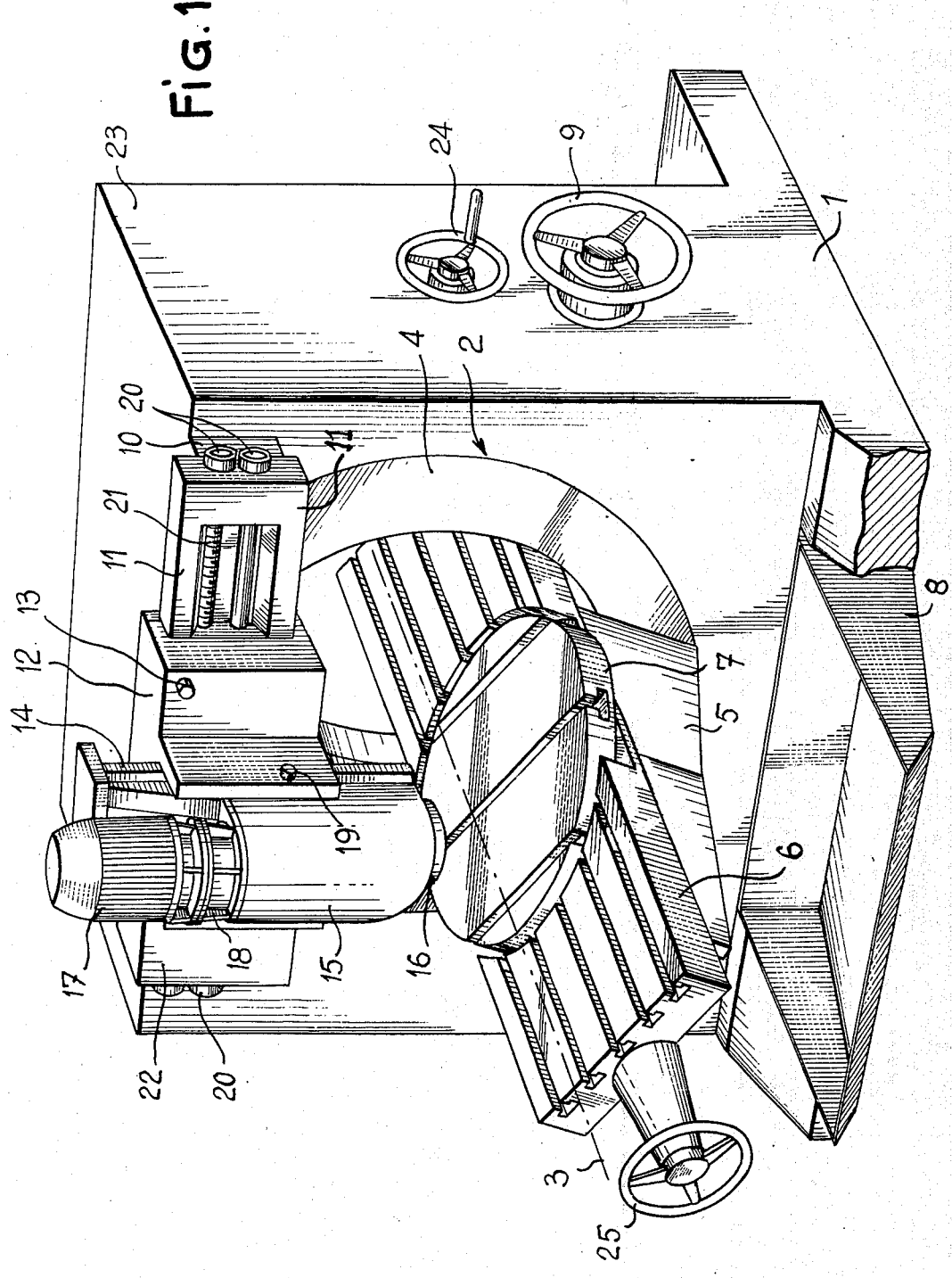
FIG. 1 is a front perspective view of an embodiment of milling machines in accordance with the invention.

As shown in the drawings, a frame 1 of the milling machine rests on the ground. The frame 1 has a circular window 2, the axis 3 of which is horizontal. A hollow cylinder 4 is rotatable in the window 2. The cylinder is guided in rotation by two rows of rollers 30 which roll on rollways 31 and 32 attached to the cylinder 4. The cylinder 4 is fixed to a bracket 5 by means of a circular part 50 fixed to the bracket and of the same diameter as the cylinder 4. Axial guidance of the assembly is ensured by the frame 1 and a keeper block 33 fixed to the cylinder 4. The bracket supports a channelled table 6. Locking in rotation of the cylinder and the bracket supporting the table is ensured by clamps 34. The table 6 is movable in a direction parallel to the axis 3 of the window and is guided by slides located underneath the table and fixed to the bracket 5 and the cylinder 4 by means of longitudinal crossbars 36. The axis 3 which is parallel with the plane of the table 6 is located above the working plane of the table.

The table 6 shown in FIG. 1 includes a circular plate 7 which is rotatable manually or automatically to enable taper milling to be performed in known manner. The table 6 may alternatively be equipped with a transverse table movable perpendicularly with respect to the longitudinal axis of the table 6.

A control crank 25 is operable to displace the table along the longitudinal axis of the milling machine.

The plane of the table can be in any position between two vertical positions symmetrical with respect to the axis 3 of the window. In FIG. 1 the table is shown slightly inclined with respect to the horizontal. The 180° rotation of the table about the longitudinal axis 3 is obtained manually by operation of a wheel 9 or automatically by a motor gear unit (not shown) located inside the frame. The motorgear unit actuates a toothed wheel fast with the cylinder 4. As shown this toothed wheel is formed by a portion of the rollway 31. In the bottom portion of the frame a pan 8 for recovery of the wetting liquid is fixed.

The displacements of the hollow cylinder 4 within the circular window 2 of the table 6 on the bracket 5 and of the plate 7 on the table are read from conventional verniers (not shown).

The upper portion of the frame includes a crossbar 10 integral with the main frame. This crossbar, includes slides 11 arranged horizontally and extending in a direction perpendicular to the horizontal axis 3. These slides 11 guide a carriage 12 which moves horizontally and perpendicularly with respect to the horizontal axis 3.

Locking of the carriage 12 with respect to the frame is assured by clamps 13. The carriage 12 supports vertical slides 14 extending in a direction perpendicular to the horizontal direction of the slides 11. These slides 14 guide a tool-holder casing 15 which moves vertically and perpendicularly to the horizontal axis 3.

Spindle 16 is guided in precision roller-bearings and is actuated by a motor 17 by means of a gearbox 18 or a variator.

The casing 15 is locked with respect to the carriage 12 by clamps 19. A lever (not shown) enables the tool-holders to be loosened and tightened. The displacements of the casing 15 and the carriage 12 are read on verniers 20 located on each side of the crossbar 10 and are controlled by screws 37 and 21 co-operating with threaded nuts.

Figure 2:
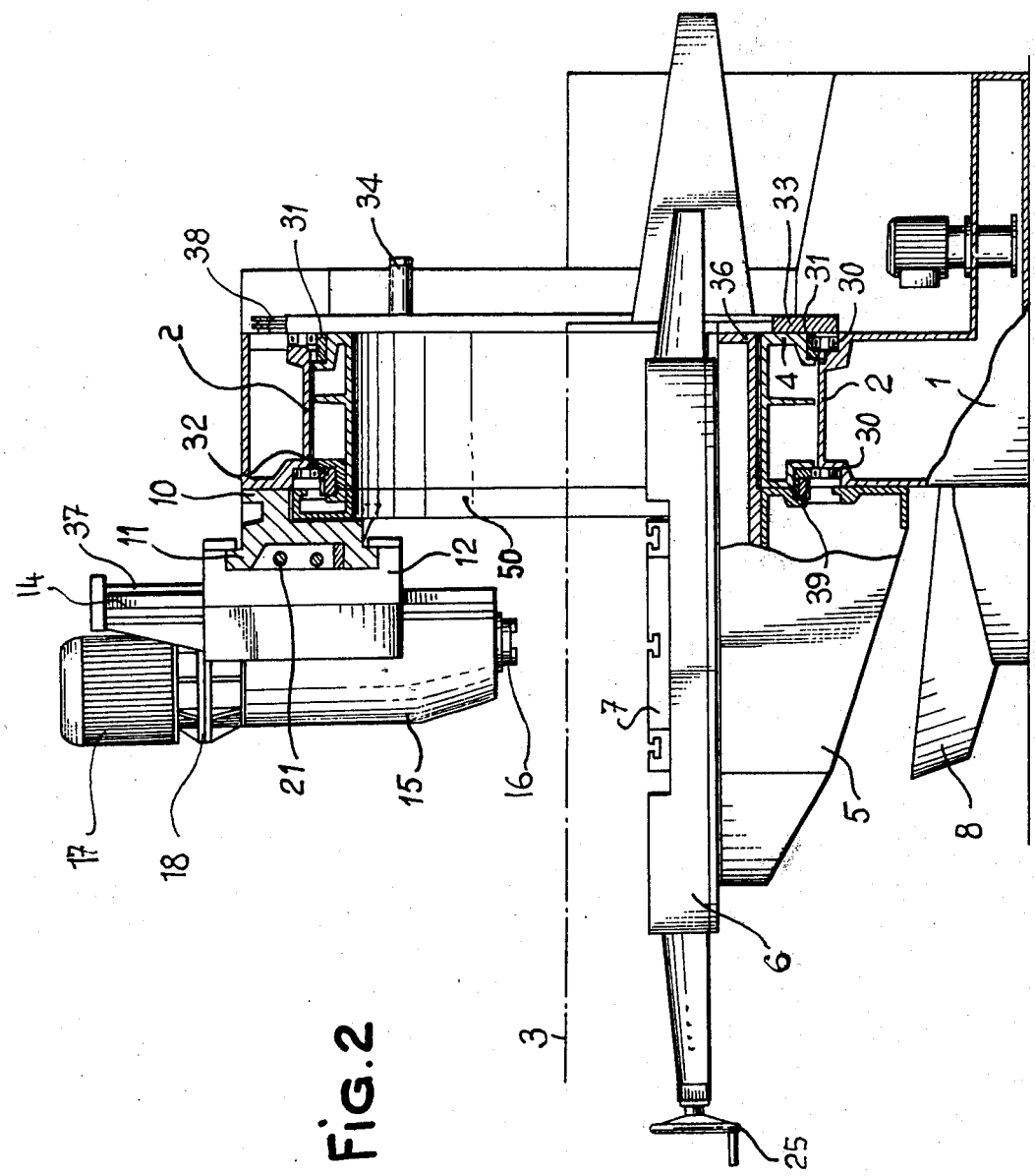
FIG. 2 is a longitudinal section of the milling machine of FIG. 1.
Figure 3:
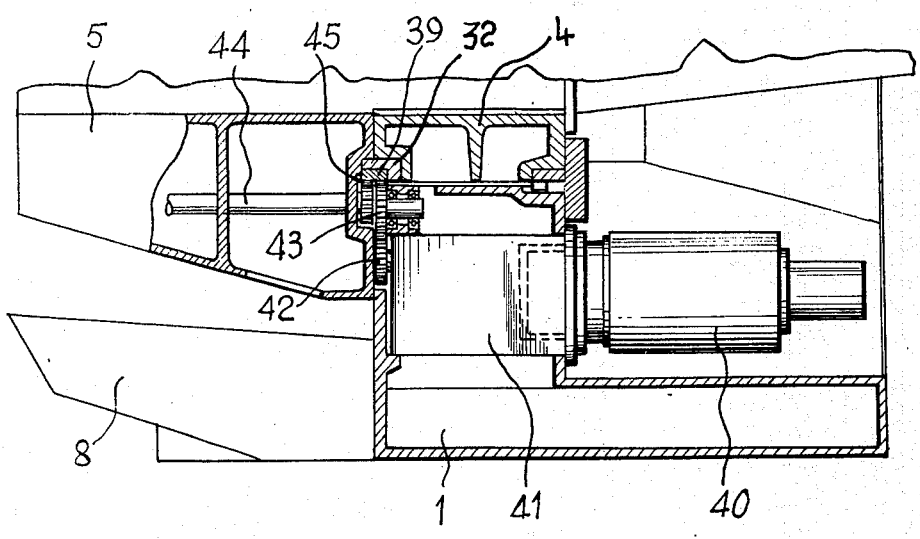
FIGS. 3 and 4 are longitudinal sections showing details of the drive of the milling machine of FIG. 1.
Figure 4:
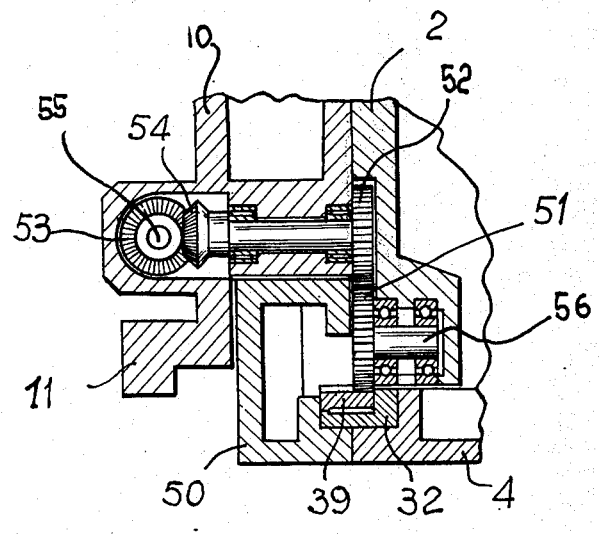

By reference to FIGS. 2, 3 and 4 it will be seen how the motion of a d.c. or a.c. electric motor 40 located inside the frame is transmitted to the carriage 12 and to the casing 15 by means of a clutchbox 22 located at one of the ends of the crossbar 10, and to the table 6 and circular plate 7. The electric motor 40 is fixed in the frame and drives, by way of a reduction gearbox 41 or a preselector gearbox, a gear 42 having an axis fixed with respect to the frame. Gear 42 drives, by way of another gear 43 mounted on roller bearings, a toothed crown 39 guided by needle slideblocks on rollway 32 of cylinder 4. Hence electric motor 40, by this system of gearing, drives toothed crown 39 which is rotatable with respect to cylinder 4.

Rotation of the toothed crown 39 is transmitted to table 6 and circular plate 7 by way of a shaft 44 rotatable in a seating provided in bracket 5. The shaft 44 has at one end a gear 45 meshing with toothed crown 39. Hence electric motor 40 by way of toothed crown 39, actuates the table and the circular plate whatever the inclination of bracket 5 with respect to the frame.

The toothed crown 39 also meshes with a gear 51 rotatable about an axle 56 fixed with respect to the upper portion of window 2 in the frame. The gear 51, whose axis of rotation is parallel with longitudinal axis 3 communicates its motion to a drive shaft 55 of carriage 12 and casing 15 via a pinion 52 and bevel gears 53,54. Drive shaft 55 which is horizontal and perpendicular to axis 3 is rotatable in seatings in crossbar 10. Thus electric motor 40 also drives shaft 55 and casing 15 and carriage 12 by way of toothed crown 39.

The mechanism enabling shaft 55 to control, via clutchbox 22 and screws 21 and 37, the casing and the carriage will not be described here in detail.

A housing 23 protects the whole of the mechanisms of the milling machine. On each side of the frame are located control cranks such as crank 24 for table 6, circular plate 7, carriage 12 and casing 15.

It will be observed that the plane of the table extends to both sides of the window 2 in the frame, inside which the table pivots. It will be clear that by tilting the table the operator can machine a face of the workpiece along any inclination. It will be observed that the axis of rotation of the milling tool is always vertical, which facilitates checking the machining.

The movable portion of the milling machine about axis 3 is balanced by a device 38.

In the embodiment which has just been described, the axis of rotation of the milling tools is vertical. It will however be appreciated that an orientatable milling machine head may be fitted onto the above described milling machine.

What is claimed is:
1. A universal milling machine comprising:
 a fixed frame,
 a supporting bracket;
 means mounting said supporting bracket in a central portion of said frame for pivotal movement about an axis, fixed with respect to said frame;
 a workpiece-holder table;
 means mounting said workpiece-holder table on said bracket for longitudinal translation in a direction fixed with respect to said bracket and parallel to said axis;
 a tool-holder casing; and
 means mounting said tool-holder casing in an upper portion of said frame;
 wherein said axis of pivotal movement of said bracket is above said table.

2. A milling machine as claimed in claim 1, wherein said axis of pivotal movement of said bracket is located substantially in the longitudinal plane of symmetry of said table.

3. A milling machine as claim in claim 1 wherein said axis is horizontal and said table is pivotable through 180° between two vertical positions.

4. A milling machine as claimed in claim 1 wherein said table includes a plate which is rotatable about an axis which is fixed with respect to the table and is perpendicular to and intersects said axis of pivotal movement of said bracket.

5. A milling machine as claimed in claim 1 wherein the axis of said tool-holder casig is perpendicular to said axis of pivotal movement of said bracket and said casing is movable in a plane perpendicular to said axis of pivotal movement of said table.

6. A milling machine as claimed in claim 1 wherein said axis of pivotal movement of said table is that of a circular window defined by said frame, a hollow cylinder to which said bracket is fixed being seated in said window and rotatable about said axis of said window.

7. A milling machine as claimed in claim 6 including a motor fixed on said frame, a crown mounted freely on said hollow cylinder, means coupling said motor to said crown and means coupling said crown to actuate said table in its motions of translation and pivoting.

8. A milling machine as claimed in claim 7, including a carriage, means mounting said carriage on said frame, means mounting said casing on said carriage and means coupling said crown to move said carriage on said frame and said casing on said carriage.

9. A universal milling machine comprising:
 a fixed frame;
 a supporting bracket;
 means mounting said supporting bracket in a central portion of said frame for pivotal movement about a horizontal axis;
 a work piece holder table;
 means mounting said table on said bracket for longitudinal movement in a direction fixed with respect to said bracket and parallel to said axis;
 a tool holder casing;
 means mounting said tool-holder casing on an upper portion of said frame with its axis vertical and for movement in a vertical plane;

wherein said axis of pivotal movement of said bracket is located above said table and substantially in the longitudinal plane of symmetry of said table.

10. A milling machine as claimed in claim 9, wherein said table is pivotable through 180° between two vertical portions.

11. A milling machine as claimed in claim 9, wherein said axis of pivotal movement of said table is that of a circular window defined by said frame, a hollow cylinder to which said bracket is fixed being stated in said window and rotatable about said axis of said window.

12. A milling machine as claimed in claim 11, including a motor fixed on said frame, a crown mounted freely on said hollow cylinder, means coupling said motor to said crown and means coupling said crown to actuate said table in its motion of translation and pivoting.

13. A milling machine as claimed in claim 12, including a carriage, means mounting said casing on said carriage means mounting said carriage on said frame, and means coupling said crown to move said carriage on said frame and said casing on said carriage.

* * * * *